Aug. 28, 1956  HENRI-GEORGES DOLL  2,761,103
INDUCTION WELL LOGGING APPARATUS
Filed Aug. 5, 1952  3 Sheets-Sheet 1

INVENTOR.
HENRI-GEORGES DOLL
BY
HIS ATTORNEYS.

Aug. 28, 1956          HENRI-GEORGES DOLL          2,761,103
                    INDUCTION WELL LOGGING APPARATUS
Filed Aug. 5, 1952                                  3 Sheets-Sheet 3
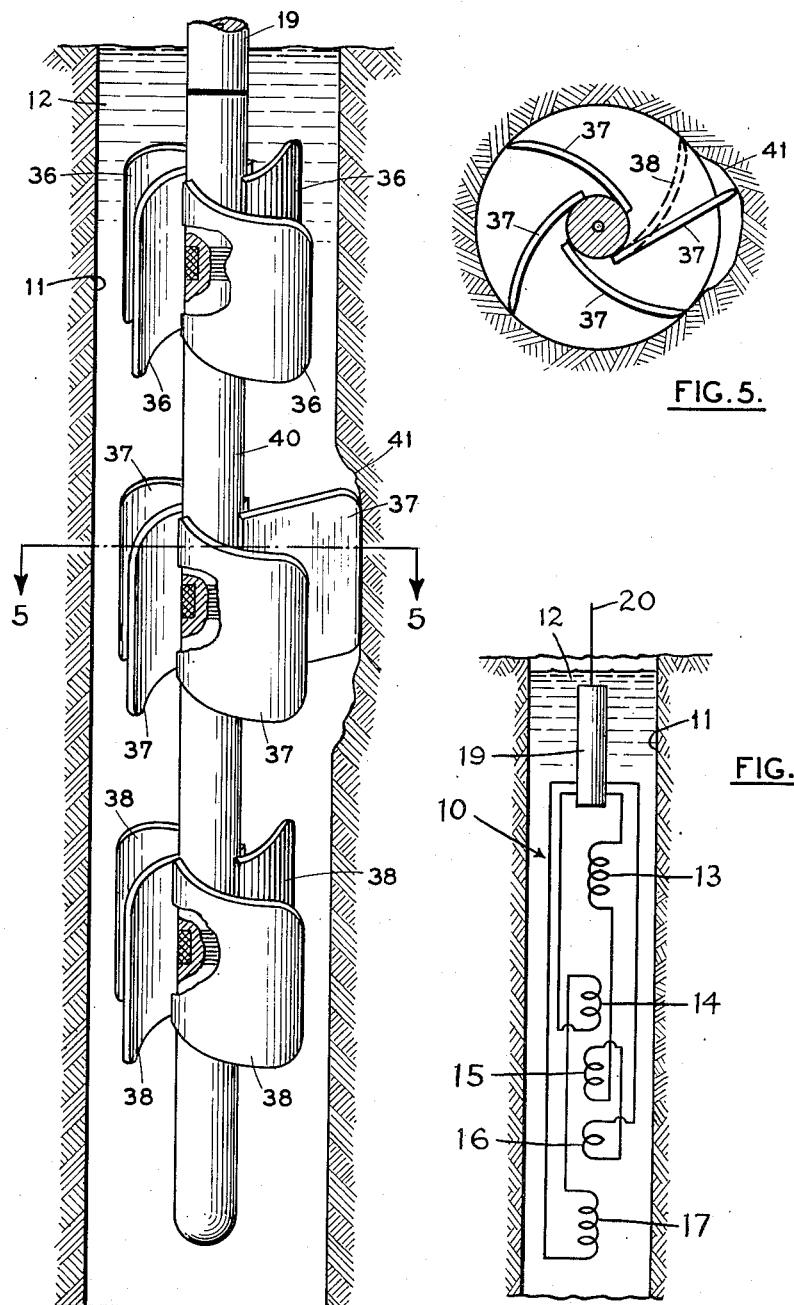
FIG.4.
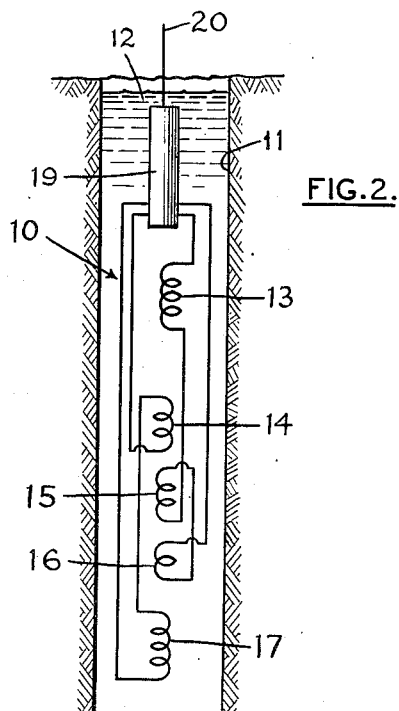
FIG.5.
FIG.2.
INVENTOR.
HENRI-GEORGES DOLL
BY
HIS ATTORNEYS.

United States Patent Office 2,761,103
Patented Aug. 28, 1956

2,761,103

INDUCTION WELL LOGGING APPARATUS

Henri-Georges Doll, Ridgefield, Conn., assignor to Schlumberger Well Surveying Corporation, Houston, Tex., a corporation of Delaware Application August 5, 1952, Serial No. 302,740

10 Claims. (Cl. 324—10)

The present invention relates to induction well logging apparatus utilizing energized coil means coupled through conductive drilling fluid or the like to the earth formations surrounding a bore hole. More specifically, it has to do with induction logging apparatus of this character embodying novel means whereby the electrical responses obtained are more truly representative of the formation property or properties to be investigated.

Various types of induction logging systems have been proposed heretofore for obtaining indications of one or more electromagnetic properties (e. g. electrical conductivity and magnetic susceptibility) of subsurface earth formations. In one typical system the desired information is obtained by measuring variations in the electrical impedance of a single coil lowered into a bore hole and electromagnetically coupled to the surrounding media by energizing it with alternating current. Multiple coil systems have also been proposed, in which the desired information is obtained by measuring the signal induced in receiver coil means by A. C. energized transmitter coil means inductively coupled thereto through the surrounding media, both the transmitter coil means and the receiver coil means being disposed in the bore hole.

If the bore hole contains conductive drilling liquid, in which the exploring coil system is immersed, eddy currents will be induced in such liquid and will contribute a spurious signal component to the response of the system. This undesired signal component is a function of the electrical conductivity of the bore hole liquid and of the diameter of the bore hole. Being variable and difficult to determine, it imposes definite limitations on the utility of both types of induction logging system.

While very substantial progress has been made in greatly minimizing the effects of eddy currents generated in the bore hole liquid by using focussing coil systems of the type disclosed in the applicant's prior Patent No. 2,582,314, issued January 15, 1952, for "Electromagnetic Well Logging Systems," any further improvement in this respect would be of definite advantage.

It is an object of the invention, accordingly, to minimize the generation of eddy currents in a conductive liquid by an electrically excited coil immersed therein.

Another object of the invention is to provide new and improved induction well logging apparatus which is adapted to minimize eddy currents in the conductive well liquid without adversely affecting eddy currents induced in the surrounding formations.

A further object of the invention is to provide means for reducing the masking effect of the conductive fluid in a bore hole on the response of induction logging apparatus disposed therein, while at the same time keeping the apparatus centered in the hole.

According to the invention, the adverse effect of eddy currents in the conductive bore hole fluid on the response of the induction logging apparatus is reduced by disposing barrier means of low electrical conductivity in the path normally taken by the eddy currents in the fluid. Where the coil system comprises solenoids having axes substantially coaxial with the bore hole, as will usually be the case, the barrier means may comprise, for example, one or more longitudinally disposed insulating fin members secured on the support for the coils and extending radially therefrom toward the bore hole wall. If the system includes a plurality of longitudinally spaced apart coils, each fin may be continuous and of sufficient length to operate over the entire coil array, or it may be only long enough to cover a single coil. In the latter event, a plurality of short fins might be employed to cover more than one coil in the system.

By appropriate spacing of the fins about the body of the apparatus, the latter may be maintained properly centered in the hole. Further, the use of flexible insulating fins with rounded corners greatly facilitates the passage of the apparatus through bore holes of different diameter, particularly where the walls of the h oles may be rough and irregular.

The invention may be better understood from the following detailed description of several representative embodiments thereof, taken in conjunction with the accompanying drawings, in which:

Fig. 2 illustrates schematically a typical circuit that might be employed in the apparatus shown in Fig. 1;

Fig. 4 is a schematic diagram of another embodiment of the invention; and

Fig. 5 is a view in transverse section taken along line 5—5 of Fig. 4 and looking in the direction of the arrows.

While the invention may be embodied in any single or multiple coil induction logging system, it will be described herein, for purposes of illustration, as applied to an induction logging system of the type disclosed in the aforementioned Patent No. 2,582,314.

Figures 1, 3:
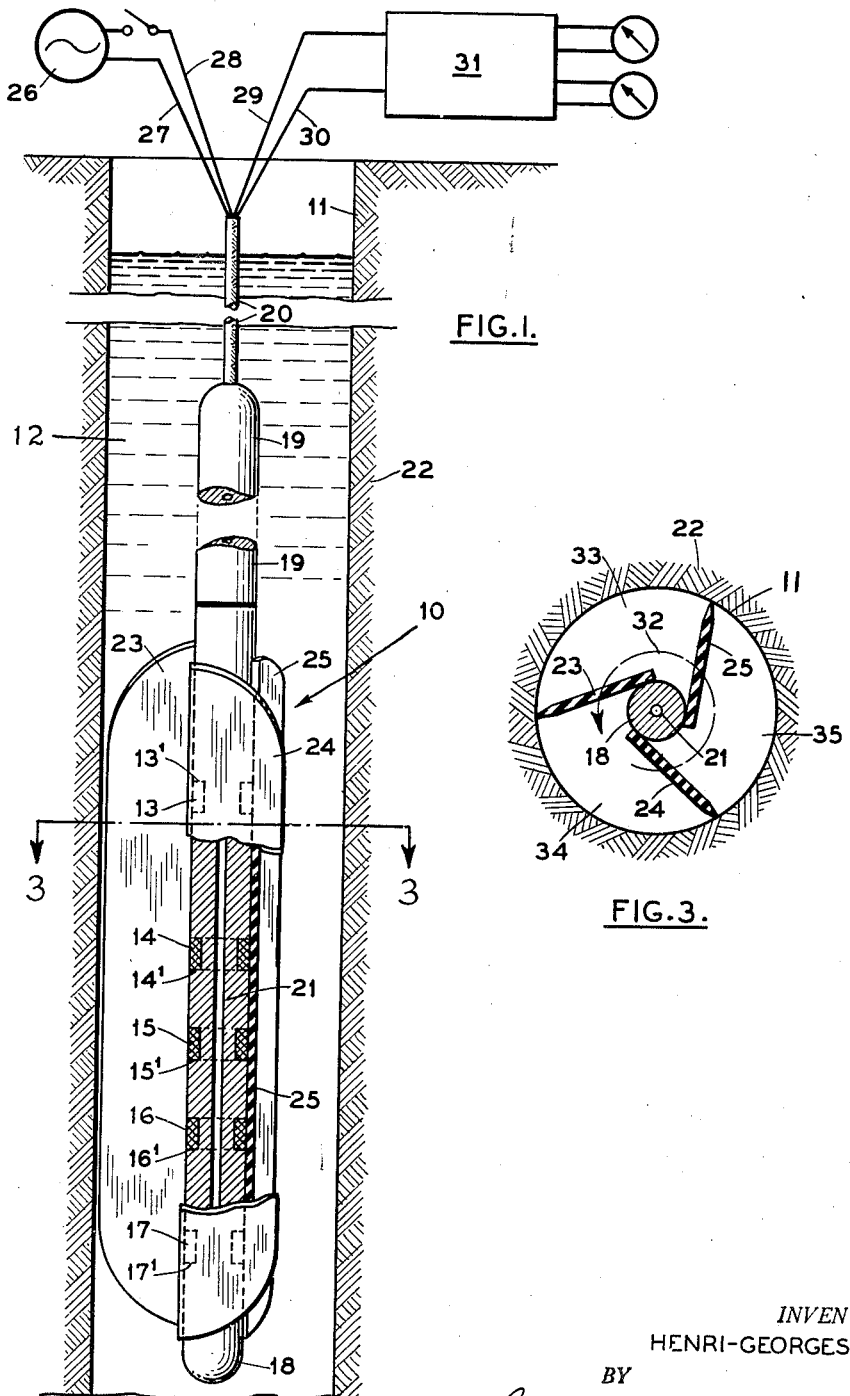
Fig. 1 is a schematic diagram of induction logging apparatus constructed according to the invention.
Fig. 3 is a view in transverse section taken along line 3—3 of Fig. 1 and looking in the direction of the arrows.

In Fig. 1 is shown induction logging apparatus 10 comprising a coil system support 18 and electronic cartridge 19 disposed in a bore hole 11 containing a column of conductive drilling liquid 12. The support 18 is made of a nonconductive, nonmagnetic material such as a sturdy plastic, for example, and it has formed therein a plurality of grooves or slots 13', 14', 15', 16' and 17' in which are wound a plurality of coils 13, 14, 15, 16 and 17. The cartridge 19 is designed to resist without damage the pressures normally encountered in bore holes and it contains the electronic elements necessary for the operation of the coil system. The cartridge 19 and the support 18 may be moved through the bore hole 11 by means of a conventional shielded electric cable 20 in combination with a winch (not shown), for example, and the electrical power necessary to operate the equipment may be supplied from a source 26 through the cable conductors 27 and 28.

A representative electrical circuit illustrating one way in which the coils may be connected is shown in Fig. 2. Thus, the coils 15 and 16 may be connected in series opposition with the coil 13 and to an alternating current source (not shown) in the cartridge 19. The coils 17 and 14 may be connected in series opposition, and the combined voltages induced therein by the coils 15, 16 and 13 may be detected by suitable apparatus in the cartridge 19 adapted to provide indications of the electrical conductivity and/or magnetic susceptibility of the surrounding formations to be transmitted to the surface of the earth through the cable conductors 29 and 30 for recording by the apparatus 31. Suitable electronic apparatus for this purpose is disclosed in my copending application Serial No. 750,307, filed May 24, 1947, for "Phase Rejection Networks." In accordance with good engineering practice, the coils 13, 14, 15, 16 and 17 preferably have electrostatic shields placed therearound which are in turn grounded to the electronic system in the cartridge 19. The conductors between the coils and the electronic cartridge 19 may pass through a channel 21 formed in the support 18.

It will be understood that the magnetic field generated by the alternating current energized transmitter coils 15, 16 and 13 causes eddy currents to flow not only in the formations 22 surrounding bore hole 11 as desired, but also in the conductive drilling fluid 12. The eddy currents flowing in the drilling fluid induce a spurious response in the receiver coils which is not related to the electrical and/or magnetic properties of the formations which are to be investigated. While the magnitude of this spurious response is quite low in a coil system of the type shown in Fig. 1 which is designated in accordance with the aforementioned patent, further desirable reduction in the effects of the eddy currents flowing in the drilling fluid is produced, according to the invention, by inserting one or more insulating barriers in the bore hole fluid opposite one or more of the coils, in such a manner as to interrupt the conductive paths through the drilling fluid about the respective coils.

Thus, in Fig. 1 a plurality of longitudinally disposed, outwardly extending, insulating fins 23, 24 and 25 are mounted on the support 18 opposite the coils 13, 14, 15, 16 and 17 so as to extend into the drilling fluid 12 for the entire length of the coil system. As shown in Fig. 3, the cross-sectional area of the fins 23, 24 and 25 is small so that they offer little opposition to the longitudinal movement of the logging apparatus 10 through drilling fluid 12. The fins may be affixed tangentially to the support 18 and preferably extend therefrom for a distance corresponding to the largest diameter of bore hole expected.

Without the provision of insulating barriers, the eddy currents would flow readily in the conductive drilling liquid 12, a typical path 32 being shown in Fig. 3. However, when one or more insulating barriers 23, 24, 25, are present as in Fig. 1, the path 32 is interrupted, and the eddy currents are confined to smaller paths within segmental portions 33, 34, 35 of the bore hole. As a result, the spurious voltage induced in the coil system is correspondingly reduced. Since the amplitude of the eddy currents decreases substantially with the distance from the coil support 18, it can be seen that the portions of the barriers 23, 24 and 25 nearest the support 18 effect the greatest reduction in eddy current flow. It is not necessary, therefore, for the barriers to extend to the wall of bore hole 11, although, as indicated above, full extension is preferable.

Obviously, the greater the number of barriers, the greater will be the reduction in eddy current flow. However, the support 18 must pass readily through bore holes of variable or different diameters. To this end, the fins 23, 24 and 25 are preferably made flexible, and may be constructed from rubber for example, so as to conform readily to variations in bore hole diameter. As a practical matter, therefore, only a limited number of fins, say from one to ten, for example, should be employed. Further, the fins are preferably tapered at their lowermost and uppermost extremities to further facilitate passage of the apparatus 10 through the bore hole.

If the fins are mounted tangentially on the support 18 in order to provide for uniform collapsing in small diameter holes, they may be readily affixed to the support 18 by means of nonconductive, nonmagnetic screws inserted in the portions of the support 18 intermediate of the coils 13, 14, 15, 16 and 17. However, the fins 23, 24 and 25 need not be mounted tangentially on the support 18, but may extend radially therefrom, for example.

Figure 1A:
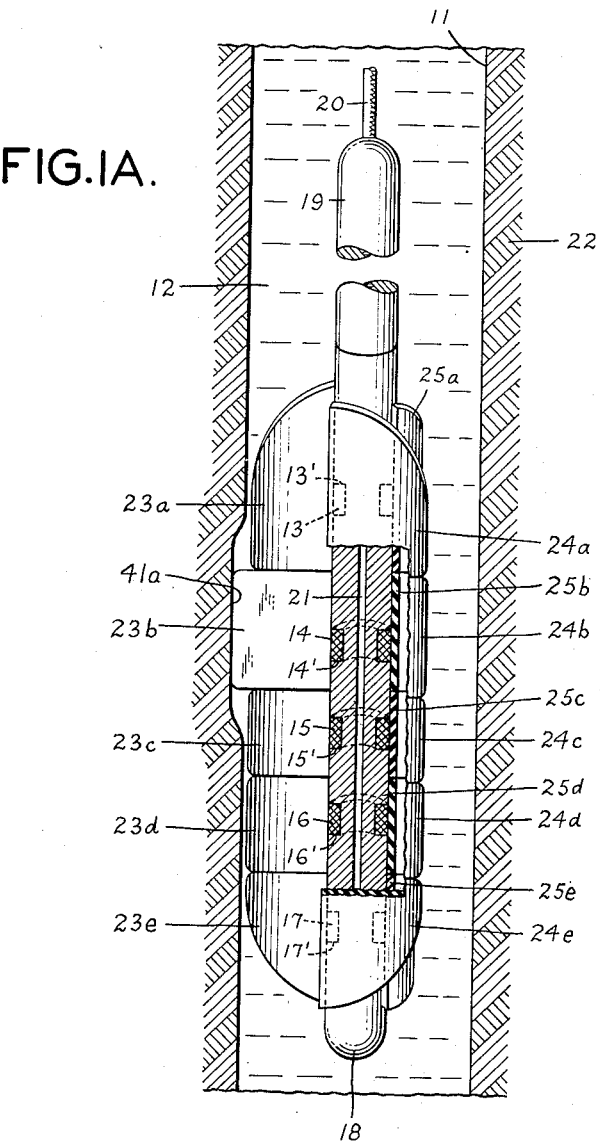
Fig. 1A is a schematic diagram of a further embodiment of the invention.

In order to enable the fins to conform even more readily to variations in bore hole diameter, each fin may be divided into a plurality of physically separate sections. For example, in Fig. 1 the fin 23 may be split into a plurality of segments 23a, 23b, 23c, 23d and 23e as shown in Fig. 1A, one opposite each of the coils 13, 14, 15, 16 and 17 by cutting transversely through the fin at locations between the respective coils. The fins 24 and 25 may be similarly designed to provide segments 24a to 24e and 25a to 25e, respectively. Where this is done, each separate fin segment may conform to the contour of the portion of the bore hole adjacent thereto, a feature which is particularly advantageous when caves are encountered along the wall of the bore hole. Thus, in Fig. 1A the fin segment 23b extends into a cave 41a found in the bore hole wall.

It will be understood that the fins need not extend longitudinally over the entire length of the coil system. For example, one or more separate fins 36, 37, and 38 may be mounted radially or tangentially opposite each of the coils on the coil system support 40, as shown in Fig. 4. In such case, the fins will conform readily to the shape of the bore hole 11, and will even extend into a cave 41 (Fig. 5) so as to minimize any response from eddy currents generated therein.

Further, with coil systems designed in accordance with the applicant's aforementioned Patent No. 2,582,314 or his Patent No. 2,582,315, it is not essential that a fin or fins be placed opposite each coil in the system; satisfactory results can be obtained by placing one or more fins opposite only the coils defined in said patents as the "principal" coils, that is, the transmitter and receiver coils contributing the largest proportion to the response. With this reduced number of fins, the logging array will pass more readily through the bore hole, with only a slight reduction of the improvement in response.

As indicated above, even a single fin opposite a given coil or coils provides substantial reduction in eddy current flow through the conductive drilling fluid about said coil or coils. However, a plurality of angularly spaced apart fins extending substantially the same distance from the support 18 are preferred in order that the fins may be utilized to maintain the coils on the support 18 substantially centered in the bore hole. Where this is done, the fins serve a dual purpose, namely, to reduce eddy current flow in the drilling fluid and to reduce the effects of eddy currents resulting from the mis-centering of the coil system. If further centering is desired, conventional centering means may be mounted on the cartridge 19 and/or on a housing below the support 18 (not shown), for example.

The invention thus provides novel and highly effective induction logging apparatus embodying means for minimizing the effects of eddy currents induced in the conductive bore hole fluid. By mounting one or more insulating fins in the vicinity of one or more of the coils in the system, the spurious response attributable to the eddy currents in the bore hole liquid may be substantially reduced. Further, by spacing a plurality of such fins about the apparatus, the latter may be maintained properly centered in the bore hole.

As stated, the invention may be embodied in a wide variety of induction logging systems, both single coil and multiple coil, and it is obviously not limited to the illustrative forms described herein by way of example, which are constructed according to the teachings of the applicant's aforementioned patents. Those embodiments are obviously susceptible of modification within the skill of the art. The invention, therefore, is not to be limited save as defined in the appended claims.

I claim:

1. In an induction well logging system, the combination of an electric coil, a member supporting said coil and adapted to be passed through a fluid-filled bore hole, and barrier means mounted on said member and extending a predetermined distance therefrom for increasing the electrical resistance of radially displaced current paths around the coil that are inductively coupled thereto, said paths normally being followed by eddy currents induced in the fluid by operation of the logging system, the barrier means interrupting said paths in the vicinity of said coil.

2. In an induction well logging system, the combination of an elongated support adapted to be passed longitudinally through a bore hole containing drilling liquid, an electrically insulated electric coil wound on said support, and barrier means in said drilling liquid mechanically connected to said support and extending a predetermined distance therefrom for increasing the electrical resistance of radially displaced current paths around the coil that are inductively coupled thereto, said paths normally being followed by eddy currents induced in the liquid by operation of the logging system, the barrier means intercepting said paths in the vicinity of said coil.

3. In an induction well logging system, the combination of a coil adapted to be lowered into a fluid-filled well and excited for providing a magnetic field to generate eddy currents in an earth structure to be logged, and insulating barrier means extending a predetermined distance from a position in the vicinity of said coil for interrupting radially displaced paths around the coil that would normally be followed by eddy currents induced in the fluid by current flow in the coil, said eddy current paths being interrupted up to the predetermined distance from said coil.

4. In an induction well logging system, the combination of a solenoid adapted to be lowered into a well containing a column of conductive liquid, alternating current source means for energizing said solenoid to provide an alternating magnetic field in an earth structure to be logged, and barrier means having at least one insulating surface lying in a plane substantially parallel to the axis of said solenoid and extending a predetermined distance from a position adjacent to said solenoid toward the wall of the well for interrupting radially displaced paths around the solenoid that would normally be followed by eddy currents induced in the liquid by current flow in the solenoid, said eddy current paths being interrupted up to the predetermined distance from said solenoid.

5. In an induction well logging system, the combination of an elongated, insulating support adapted to be lowered into a well containing a column of conductive liquid, at least two coaxially related coils carried by said support, one of said coils being an exciting coil and the other being a pick-up coil, and at least one fin member of insulating material positioned in the vicinity of at least one of said coils in a plane parallel to the axis of said coils and extending from said support a predetermined distance towards the wall of the well to interrupt radially displaced paths around said one coil that would normally be followed by eddy currents induced in the liquid by current flow in said one coil.

6. In an induction well logging system for use in a well containing a column of conductive liquid, the combination of an elongated, nonmagnetic, insulating support adapted to be lowered into a well, at least two inductively coupled coaxial coils wound on said support, A. C. source means connected to energize one of said coils, electrical indicating means connected to the other of said coils, and at least one insulating fin member projecting from said support a predetermined distance towards the wall of the well, said fin being longitudinally disposed with respect to said support for intercepting eddy currents induced by current flow in said one coil within said well liquid, said eddy currents normally following radially displaced paths around said one coil.

7. In a well logging system for use in a well containing a column of conductive liquid, the combination of an elongated support adapted to be lowered into a well, at least one exciting coil carried by said support for setting up a magnetic field, at least one pick-up coil spaced longitudinally from said exciting coil for intercepting at least a portion of said field, and a plurality of longitudinally extending insulating fin members projecting a predetermined distance towards the wall of the well carried by said support and spanning said coils for reducing the flow of eddy currents induced by current flow in the exciting coil in the well liquid, said eddy currents normally following radially displaced paths around said support in the immediate vicinity thereof.

8. In an induction well logging system for use in a bore hole containing a column of conductive liquid, the combination of an elongated, insulating, nonmagnetic support, an exciting coil wound on said support and coaxial therewith, a second coaxial coil wound on said support and longitudinally spaced apart from said first coil for picking up at least a portion of the field set up by said exciting coil, and a plurality of flexible insulating fins angularly spaced about and radiating outwardly from said support and longitudinally disposed with respect to said support for intercepting eddy currents induced by current flow in said exciting coil in the well liquid, said eddy currents normally following radially displaced paths around said support in the immediate vicinity thereof, said fins assisting in maintaining the system centered in the bore hole.

9. In an induction well logging system for use in wells containing a column of conductive liquid, the combination of a support adapted to be lowered into a well, at least two longitudinally spaced apart coils carried thereon, A. C. source means connected to energize one of said coils to induce a signal in the other coil, electrical indicating means connected to said other coil, and a plurality of angularly spaced apart insulating fin members secured on said support in the vicinity of at least one of said coils and lying in radially extending planes parallel to the longitudinal axis of the bore hole to interrupt radially displaced paths around said one coil that would normally be followed by eddy currents induced in the liquid by current flow in said one coil.

10. In an induction well logging system for use in wells containing a column of conductive liquid, the combination of a support adapted to be lowered into a well and carrying at least two longitudinally spaced apart coils thereon, A. C. source means connected to energize one of said coils to induce a signal in the other coil, electrical indicating means connected to said other coil, a first plurality of angularly spaced apart, flexible, insulating fin members secured on said support in the vicinity of one of said coils and lying in radially extending planes parallel to the longitudinal axis of the bore hole, and a second plurality of angularly spaced apart, flexible, insulating fin members secured on said support in the vicinity of the other of said coils and lying in radially extending planes parallel to the longitudinal axis of the bore hole.

References Cited in the file of this patent
UNITED STATES PATENTS

| | | |
|---|---|---|
| 2,246,460 | Bazzoni | June 17, 1941 |
| 2,264,318 | Lee | Dec. 2, 1941 |
| 2,304,051 | Beers | Dec. 1, 1942 |
| 2,517,603 | Silverman | Aug. 8, 1950 |
| 2,564,861 | Sherborne | Aug. 21, 1951 |